No. 744,927. PATENTED NOV. 24, 1903.
F. X. MAY.
LUBRICATOR.
APPLICATION FILED JULY 28, 1902.
NO MODEL.
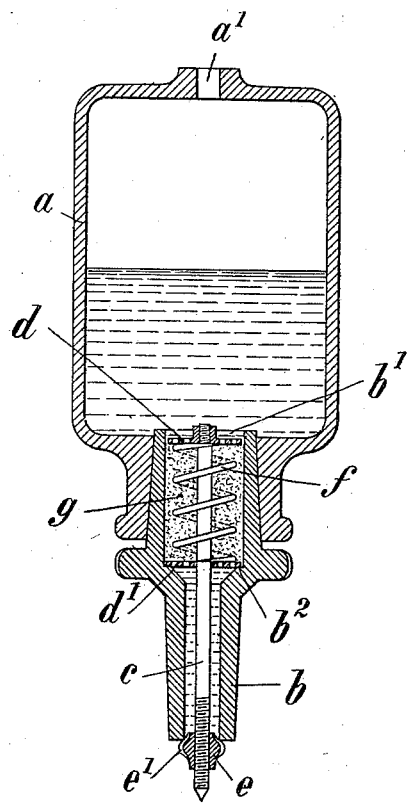

No. 744,927. Patented November 24, 1903.

UNITED STATES PATENT OFFICE.

FRANZ XAVER MAY, OF HAMBURG, GERMANY, ASSIGNOR TO CYRUS A. BRYANT, OF HAMBURG, GERMANY.

LUBRICATOR.

SPECIFICATION forming part of Letters Patent No. 744,927, dated November 24, 1903.

Application filed July 28, 1902. Serial No. 117,372. (No model.)

*To all whom it may concern:*

Be it known that I, FRANZ XAVER MAY, a subject of the German Emperor, and a resident of Hamburg, in the German Empire, have invented certain new and useful Improvements in Lubricators, of which the following is a specification.

The present invention relates to improvements in lubricators for supplying oil or grease to rubbing-surfaces in order to diminish friction, particularly of that class in which the oil, &c., is allowed to flow out from an oil cup or reservoir through a hollow stem or tube to the machinery part to be lubricated. The object of the improvements is to provide means whereby the outflow of the oil may be regulated; and with this end in view my improvements consist of a filtering device suitably arranged between the oil-cup and its discharge-tube and of a suitable means for compressing or shaking up (loosening) the filtering material, preferably wool, wadding, or asbestos fibers, of the said filtering device, so as to allow a less or greater quantity of oil to pass through the filtering material and the discharge-tube in proportion as a less or greater lubrication is desired.

In order that my invention may be more fully understood, I shall now proceed to describe the same in detail with reference to the accompanying drawing, in which I have shown a central vertical section of a lubricator according to and embodying my invention.

Similar letters refer to similar parts.

The oil-cup $a$ of suitable form or shape is provided with an air-admitting hole $a'$ and has fixed into a hole of its bottom an oil-discharge tube or nozzle $b$. The bore of this tube is enlarged in diameter in its upper part, so as to form a chamber $b'$. A central rod or stem $c$ of less diameter than the bore of the tube $b$ passes through the latter and its chamber $b'$ and carries at its upper end a perforated plate or abutment $d$ and at its lower end a plug or nut $e$, screwed upon the threaded end of the stem $c$ and provided on its periphery with a plurality of longitudinal grooves $e'$, communicating with the interior of the tube $b$. The stem $c$ is held in position with the nut $e$ pressed against and partly into the discharge end of the tube $b$ by a spiral spring $f$, encircling the said stem within the chamber $b'$ and resting with its upper end against the perforated plate $d$ and with its lower end against a similar perforated plate $d'$, fitting loosely with a central hole upon the stem $b$ and being supported by an annular shoulder $b^2$ of the filtering-chamber $b'$. The free space within the filtering-chamber $b'$—that is to say, between the perforated plates, the stem, and the coils of the spiral spring—is filled up with wool fibers $g$. The threaded end of stem $c$ projects beyond the discharge end of the nozzle $b$, and the nut $e$ is carried by the projecting end of the stem so as to bear against the nozzle. Thus the longitudinal grooves $e'$ of the nut constitute the discharge-ducts for the lubricant, and by turning the nut, and thereby compressing the spring, the quantity of lubricant discharged through said ducts may be easily regulated.

The supply of oil from the cup takes place by the descending of the oil through the perforated plate $d$, the filtering material $g$, the perforated plate $d'$, and the discharge-tube $b$ and by its final outflow through the grooves $e'$ of the nut $e$, an equivalent amount of external air being admitted at the same time into the cup through the air-hole $a'$.

When the amount of oil dropping out through the grooves $e'$ is too great, it may easily be reduced to the proper supply, even while the engine or machine part is at work, by screwing home the nut $e$, and thereby compressing the fibrous filtering material between the perforated plates, so that the passage of the oil through the said filtering material is retarded accordingly. On the other hand, when the supply of oil is to be increased it is only necessary to loosen or unscrew the nut $e$ to a proper extent. The thereby released and expanding spring $f$ acts to raise the plate $d$ and to loosen or shake up the previously-compressed filtering material, so that the passage of the oil through the latter is facilitated in proportion as the filtering material has been shaken up.

Having fully described my invention, what I claim, and desire to secure by Letters Patent, is—

A lubricator provided with a nozzle, a threaded stem within and projecting beyond the discharge end thereof, a coiled spring encircling the stem, a bearing-collar for said spring on the inner end of said stem, and said spring also having a bearing within said nozzle, a fibrous filtering material between the spring-coils, and a longitudinally-grooved nut mounted upon the projecting end of the stem and bearing against the nozzle, the nut-grooves constituting discharge-ducts for the lubricant, substantially as specified.

FRANZ XAVER MAY.

Witnesses:
 MAX LEMCKE,
 E. H. L. MUMMENHOFF.